US010688721B2

(12) United States Patent
Swanson et al.

(10) Patent No.: US 10,688,721 B2
(45) Date of Patent: Jun. 23, 2020

(54) ADDITIVE MANUFACTURING SYSTEM WITH SLIDING THERMAL ISOLATOR

(71) Applicant: Stratasys, Inc., Eden Prairie, MN (US)

(72) Inventors: William J. Swanson, St. Paul, MN (US); Dominic F. Mannella, Minnetonka, MN (US)

(73) Assignee: STRATASYS, INC., Eden Prairie, MN (US)

( * ) Notice: Subject to any disclaimer, the term of this patent is extended or adjusted under 35 U.S.C. 154(b) by 4 days.

(21) Appl. No.: 16/327,531

(22) PCT Filed: Aug. 23, 2017

(86) PCT No.: PCT/US2017/048247
§ 371 (c)(1),
(2) Date: Feb. 22, 2019

(87) PCT Pub. No.: WO2018/039370
PCT Pub. Date: Mar. 1, 2018

(65) Prior Publication Data
US 2019/0240904 A1 Aug. 8, 2019

Related U.S. Application Data

(60) Provisional application No. 62/378,495, filed on Aug. 23, 2016.

(51) Int. Cl.
*B29C 64/25* (2017.01)
*B33Y 30/00* (2015.01)
(Continued)

(52) U.S. Cl.
CPC ............ *B29C 64/25* (2017.08); *B29C 64/227* (2017.08); *B33Y 30/00* (2014.12); *B29C 64/364* (2017.08)

(58) Field of Classification Search
CPC ..... B29C 64/227; B29C 64/25; B29C 64/255; B29C 64/30
See application file for complete search history.

(56) References Cited

U.S. PATENT DOCUMENTS 5,866,058 A 2/1999 Batchelder et al.
6,722,872 B1 4/2004 Swanson et al.
(Continued)

FOREIGN PATENT DOCUMENTS

EP 1204517 A1 5/2002
JP 2007161232 A 6/2007

OTHER PUBLICATIONS

International Search Report and Written Opinion dated Nov. 30, 2017 for corresponding International Application No. PCT/US2017/048247, filed Aug. 23, 2017.
(Continued)

*Primary Examiner* — Timothy Kennedy
(74) *Attorney, Agent, or Firm* — Westman, Champlin & Koehler, P.A.

(57) ABSTRACT

An additive manufacturing system includes a build chamber with at least first and second side walls and top and bottom walls. A central deformable, thermal insulator has a first edge and a second edge, where a print head carriage is movably retained within the central deformable thermal insulator and is configured to move print heads within a build plane of the build chamber under control of a gantry. The system includes first and second dynamic thermal barriers each having a length between a proximal edge and a distal edge wherein the proximal edge is configured to be secured to the central deformable insulator and a distal edge is configured to be movably retained to the build chamber such that as the print head carriage moves laterally across the build plane, each dynamic thermal barrier moves with the
(Continued)

central deformable insulator and print head carriage, and retains its length.

20 Claims, 5 Drawing Sheets

(51) Int. Cl.
*B29C 64/227* (2017.01)
*B29C 64/364* (2017.01)

(56) References Cited

U.S. PATENT DOCUMENTS

2004/0104515 A1 6/2004 Swanson et al.
2013/0078073 A1 3/2013 Comb et al.
2017/0129181 A1* 5/2017 Kunioka ............... B29C 64/295

OTHER PUBLICATIONS

Canadian Office Action, application No. 3,034,537, dated Mar. 3, 2020, 6 pages.
European Office Action, application No. 17726282.6, dated Mar. 10, 2020, 4 pages.
Korean Office Action, application No. 10-2019-7008429, dated Mar. 26, 2020, 12 pages.

* cited by examiner

ADDITIVE MANUFACTURING SYSTEM WITH SLIDING THERMAL ISOLATOR

CROSS-REFERENCE TO RELATED APPLICATION

This Application is a Section 371 National Stage Application of International Application No. PCT/US2017/048247, filed Aug. 23, 2017 and published as WO2018/039370 on Mar. 1, 2018, in English, which claims the benefit of U.S. Provisional Patent Application Ser. No. 62/378,495, filed on Aug. 23, 2016, the contents of which are hereby incorporated by reference in their entirety.

BACKGROUND

The present disclosure relates to additive manufacturing systems for building three-dimensional (3D) parts with layer-based, additive manufacturing techniques. In particular, the present disclosure relates to additive manufacturing systems that utilize a sliding thermal isolator.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, one or more tool paths are then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads while the print head moves along the tool paths. The extruded part material fuses to a build substrate or to previously deposited part material, and solidifies upon a drop in temperature. The position of the print head relative to the substrate is then incremented as the part is built, typically along a build axis (e.g., a z-axis) substantially normal to a build plane (e.g., an x-y build plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure relates to an additive manufacturing system includes a chamber comprising at least first and second side walls connected with a bottom wall and a top wall. A central thermal insulator has a first edge and a second edge, where the central thermal insulator is deformable and is configured to movably retain a print head carriage that is configured to move print heads within a build plane of the build chamber. The system includes a first and a second dynamic thermal barrier each having a length between a proximal edge and a distal edge, wherein the proximal edge is configured to be secured to the first edge of the central deformable insulator and the second edge is configured to be slidably retained to the build chamber such that as the print head carriage moves laterally the first and second dynamic thermal barriers each move with the print head carriage and retain their length and are configured to flex and move in a non-planar path.

In one aspect, the first sliding thermal barrier includes a backer sheet having a first edge and a second edge and an area configured to substantially cover the opening. A plurality of slats are positioned side by side on the backer sheet, wherein each slat comprises at least one slot wherein when the plurality of slats are positioned side by side, the at least one slot of the plurality of slats forms at least one channel. At least one strap is positioned within the at least one channel, the at least one strap having a proximal end and a distal end, the proximal end of the strap secured proximate the first edge of the backer sheet and the distal end secured proximate the second edge of the backer sheet.

In another aspect, the first sliding thermal barrier includes first and second backer sheets positioned on opposite sides of the plurality of slats positioned side by side. Each slat comprises at least one slot wherein when the plurality of slats are positioned side by side, the at least one slot of the plurality of slats forms at least one channel. At least one strap is positioned within the at least one channel, the at least one strap having a proximal end and a distal end, the proximal end of the strap secured proximate the first edge of the first and second backer sheets and the distal end secured proximate the second edge of the first and second backer sheets.

In another aspect of the present disclosure relates to an additive manufacturing system includes a build chamber comprising at least first and second side walls connected with a bottom, a top wall and a back wall. The system includes a central deformable insulator having a first edge and a second edge and a print head carriage movably retained within the central deformable insulator and configured to move print heads within a build plane of the build chamber. The system includes a first dynamic thermal barrier having a first length between a proximal edge and a distal edge, wherein the proximal edge is configured to be removably secured to the first edge of the a central deformable insulator with a first securing mechanism and a second edge is configured to be slidably retained to the build environment such that as the print head carriage moves laterally the first dynamic thermal barrier moves with the print head carriage and retains the first length and is configured to flex and move in a non-planar path. The system includes a second dynamic thermal barrier having a second length between a proximal edge and a distal edge, wherein the proximal edge is configured to be removably secured to the second edge of the a central deformable insulator with a second securing mechanism and a second edge is configured to be slidably retained to the build environment such that as the print head carriage moves laterally the second dynamic thermal barrier moves with the print head carriage and retains the second length and is configured to flex and move in a non-planar path.

In another aspect of the present disclosure, the first and second sliding thermal barriers are mirror images of each other. Both the first and second sliding thermal barriers each include a backer sheet having a first edge and a second edge and an area configured to substantially cover the opening. A plurality of slats is positioned side by side on the backer sheet, wherein each slat comprises at least one slot wherein when the plurality of slats are positioned side by side, the at least one slot of the plurality of slats forms at least one channel. At least one strap is positioned within the at least one channel, the at least one strap having a proximal end and a distal end, the proximal end of the strap secured proximate the first edge of the backer sheet and the distal end secured proximate the second edge of the backer sheet.

In another aspect of the present disclosure, the first and second sliding thermal barriers are mirror images of each other. Both the first and second sliding thermal barriers each include first and second backer sheets positioned on opposite sides of the plurality of slats positioned side by side. Each slat includes at least one slot wherein when the plurality of slats are positioned side by side, the at least one slot of the plurality of slats forms at least one channel. At least one strap is positioned within the at least one channel, the at least one strap having a proximal end and a distal end, the proximal end of the strap secured proximate the first edge of the first and second backer sheets and the distal end secured proximate the second edge of the first and second backer sheets.

Definitions

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis. Furthermore, in embodiments in which the printed layers are planar, the printing axis is normal to the build plane of the layers.

The term "printing onto", such as for "printing a 3D part onto a print foundation" includes direct and indirect printings onto the print foundation. A "direct printing" involves depositing a flowable material directly onto the print foundation to form a layer that adheres to the print foundation. In comparison, an "indirect printing" involves depositing a flowable material onto intermediate layers that are directly printed onto the receiving surface. As such, printing a 3D part onto a print foundation may include (i) a situation in which the 3D part is directly printed onto to the print foundation, (ii) a situation in which the 3D part is directly printed onto intermediate layer(s) (e.g., of a support structure), where the intermediate layer(s) are directly printed onto the print foundation, and (iii) a combination of situations (i) and (ii).

The term "providing", such as for "providing a chamber" and the like, when recited in the claims, is not intended to require any particular delivery or receipt of the provided item. Rather, the term "providing" is merely used to recite items that will be referred to in subsequent elements of the claim(s), for purposes of clarity and ease of readability.

DETAILED DESCRIPTION

Figure 1:
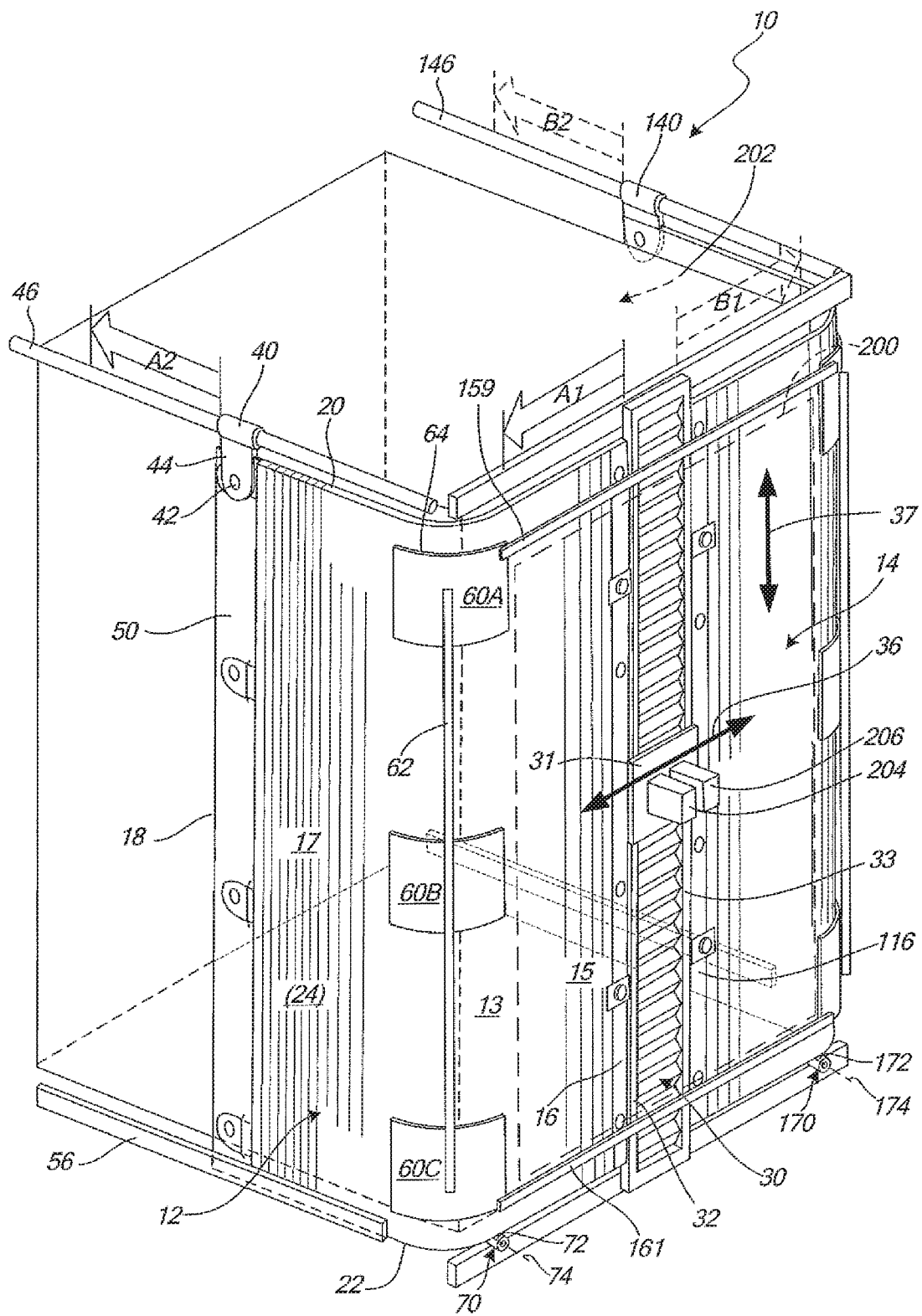
FIG. 1 is a first perspective view of an exemplary additive manufacturing system of the present disclosure for printing a 3D part horizontally.

The present disclosure is directed to a flexible, sliding thermal barrier for an additive manufacturing system. What is meant by a sliding thermal barrier is a thermal barrier that has a length where one end is attached to a central thermal insulator that carries at least one print head and the other end of the barrier is free to travel or move as the print head moves or travels such that the barrier substantially retains its length while the system operates to print 3D objects. Otherwise stated, the thermal barrier is not configured to expand and contract as the print head moves, but rather retains the same length as it moves with the central thermal insulator during a printing process.

Thermal barriers can be utilized to retain heat within a build environment such as a build chamber of an additive manufacturing system. When extruding molten polymeric material, a heating mechanism may heat and maintain the environment, at least in the vicinity of the print head, at one or more temperatures that are in a window between the solidification temperature and the creep relaxation temperature of the part material and/or the support material. This reduces the rate at which the part and support materials solidify after being extruded and deposited (e.g., to reduce distortions and curling), where a creep relaxation temperature of a material is proportional to its glass transition temperature. Examples of suitable techniques for determining the creep relaxation temperatures of the part and support materials are disclosed in Batchelder et al., U.S. Pat. No. 5,866,058. However, the present disclosure is not limited to an additive manufacturing system with a heated build chamber.

A thermal barrier known in the prior art additive manufacturing systems is secured in place at its outer edge and compresses in accordion-style pleats as a print head carriage moves under control of a central thermal insulator. A fused deposition modeling system available from Stratasys, Inc., under the trademark FDM® has two thermal barriers secured on either side of the print head carriage and has the other ends secured to the top of chamber wall, as shown in commonly-owned Swanson et al., U.S. Pat. No. 6,722,872 entitled "High Temperature Modeling Apparatus". The thermal barriers span the ceiling of the chamber and retains heat within the build environment or chamber while a print head extrudes material along tool paths within the chamber. These thermal barriers are constructed of sections of pleated material that can expand and contract, such as that of the movement of an accordion. In these prior art systems, the pleated material of the thermal barrier necessarily limits travel of the central thermal insulator in a direction of travel, as the compressed material consumes space at the limit of travel. Also, as shown in Swanson et al., U.S. Pat. No. 6,722,872, in addition to the thermal barriers, the prior art FDM® additive manufacturing systems include a hinged door to allow a user to access 3D parts printed in the build chamber.

The dynamic thermal barrier of the present disclosure permits a maximal range of motion of the print heads and eliminates the need to provide a hinged access door. In particular, the dynamic thermal barrier has one edge attached to the central thermal insulator and the other end is free to move. This configuration allows the central thermal insulator to move through its entire range of motion and therefore build larger parts using the same central thermal insulator and build environment as used with the prior thermal barrier. Further, the presently disclosed dynamic thermal barrier provides access to the build environment and/or print heads by separating the attached edge of the one or more of the dynamic thermal barriers from the central thermal insulator, typically through the manipulation of one or more securing mechanisms, such as a latch.

The presently disclosed dynamic thermal barrier can be utilized in an additive manufacturing system that prints in a substantially vertical build plane and is indexed along a substantially horizontal print axis. It can also be utilized in other architectures, including an additive manufacturing system that prints in a substantially horizontal build plane and is indexed along a substantially vertical print axis. The disclosed system is configured to enable printing of long or tall 3D parts that have a length greater than a length of a build chamber or a build environment, by providing a build chamber having a rear port that opens to allow 3D parts to extend outside of the chamber. The additive manufacturing system can include a heating mechanism configured to heat the build environment of the system, such as build plane region proximate the print carriage. The system includes one or more print heads configured to print a 3D part in a layer-by-layer manner onto a print foundation (e.g., a platen or other component having a receiving surface) in the heated chamber or other build region.

As the printed 3D part grows on the print foundation, the print foundation may be indexed or otherwise moved through the port or out of the build environment. The printed 3D part may continue to grow out of the port or the build environment until a desired length or height is achieved. The use of the port expands the printable volume along a printing axis of the system, allowing long or tall 3D parts, such as airfoils, manifolds, fuselages, and the like to be printed in a single printing operation. As such, the 3D parts may be larger than the dimensions of the build environment of the additive manufacturing system.

The additive manufacturing system may be configured to print 3D parts in a horizontal direction, a vertical direction, or along other orientations (e.g., slopes relative to the horizontal and vertical directions). Further, the sliding thermal barrier can be utilized with a typical fused deposition modeling system that includes an enclosed chamber which limits the size of the 3D part being built.

Figure 2:
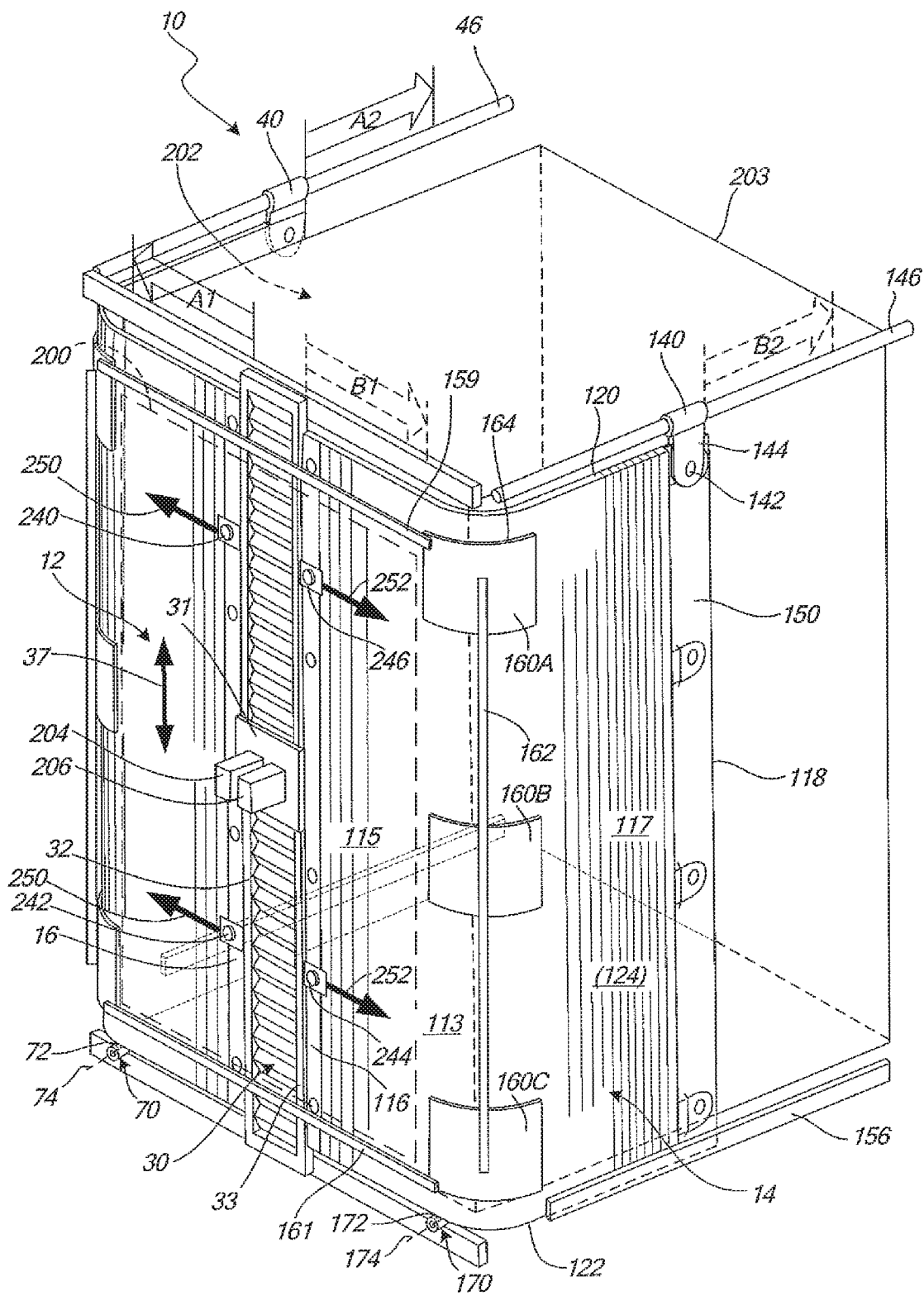
FIG. 2 is a second perspective view of the exemplary additive manufacturing system of the present disclosure for printing the 3D part horizontally.

Referring to FIGS. 1 and 2, an additive manufacturing system 10 is illustrated without a casing to expose left and right sliding thermal barriers 12 and 14. Each thermal barrier includes an inner edge that is secured to a central thermal insulator 30. The gantry (not shown) moves the print heads 204 and 206, which are mounted on a print head carriage 31. The gantry (not shown) moves in a lateral direction of arrows 36 as the print head carriage 31 laterally moves in a side to side direction and moves in the direction of arrows 37 as the print head carriage 31 moves up and down. The print head carriage 31 is moved under control of a gantry (not shown) along tool paths defined for extrusion by print heads 204 and 206. Movement of the print head carriage 31 in the direction of arrows 37 compresses the central thermal insulator 30, while movement of the print head carriage 31 in the direction of arrows 36 causes the thermal barriers 12 and 14 to slide right or slide left.

The left sliding thermal barrier 12 includes a right edge 16 that is secured to a left edge 32 of the central thermal insulator 30. The left thermal barrier 12 includes a left edge 18 that moves in a direction of arrow A2 when right edge 16 moves a direction substantially parallel to a build plane as indicated by arrow A1. A length of the arrows A1 and A2 is substantially a length of travel from a mid-point of a build plane to a limit of the build plane.

A top edge 20 of the left sliding thermal barrier 12 is supported by a left isolator bearing housing 40 by positioning a rivet 42 through a tab 44 extending from the left isolator bearing 40 housing and a strap (not shown) and a backing layer 50 proximate the left edge 18 of the left sliding thermal barrier 12. While a rivet 42 is illustrated and disclosed herein, the present application can utilize any suitable securing mechanism such as, but not limited to a bolt and nut, a screw, a clamp, a camming mechanism and/or an adhesive.

The isolator bearing housing 40 retains a bearing that is positioned about a top, left shaft 46 having a substantially similar cross-sectional configuration as a through bore in the bearing. The bearing provides for smooth travel of the housing 40 over the top, left shaft 46 as the central thermal insulator 30 is moved in the direction of the arrows 36.

With the top edge 20 located a selected distance from the top left shaft 46, a bottom edge 22 of the left sliding thermal barrier 12 is free to move relative to the top edge 20. To retain the bottom edge 22 in a selected location, a retaining member 50 is secured to the system 10 to engage a back surface 24 of the left sliding thermal barrier 12 to retain the bottom edge 22 and the top edge 20 of the sliding thermal barrier 12 in a substantially vertical plane, as the left sliding thermal barrier 12 is moved by the central thermal insulator 30.

The left sliding thermal barrier 12 includes a corner portion 13 that transitions a first portion 15 proximate the right edge 16 to a second portion 17 proximate the left edge 18. The first portion 15 is substantially orthogonal to the second portion 17 wherein the corner portion 13 provides a location of the transition in direction. A length of the first portion 15 can become larger or smaller depending upon the location of the central thermal insulator 30.

The second portion 17 will decrease a same length as the increase in length in the first portion 15 and the second portion 17 will increase a same length as the decrease in length of the first portion 15 as the central thermal insulator 30 moves. Therefore, the location of the corner portion 13 on the thermal barrier 12 will change relative to the left edge 18 and the right edge 16 depending upon the location of the central thermal insulator 30.

To aid in a transition of the thermal barrier 12 from the first portion 15 to the second portion 17 and vice versa, the system 10 includes a plurality of curved guides 60A, 60B, 60C that are secured to a substantially vertical brace 62. Inner surfaces 64 of the plurality of curved guides 60A, 60B, 60C have a concave configuration that are configured to engage the back surface 24 of the left sliding thermal barrier 12. As illustrated, the plurality of guides 60 includes an upper curved guide 60A, a middle, curved guide 60B and a bottom curved guide 60C that engage the left sliding thermal barrier, where each curved guide 60A, 60B and 60C has substantially the same configuration. While three curved guides are illustrated, the present disclosure can include one or more curved guides.

As the central thermal insulator 30 is moved toward the curved guides 60A, 60B and 60C, the length of the first portion 15 decreases and imparts a force into the concave surface 64 in a vector along the plane of travel of the first portion 15. The concave surfaces 64 of the curved guides 60A, 60B and 60C redirects the force in a vector substantially normal to the vector in the plane of travel such that the second portion 17 moves in the direction of the redirected vector.

As the central thermal insulator 30 is moved toward the right side of the system 10, the first portion 15 grows in length and the second portion 17 decreases in length and engages the concave surfaces 64 of the curved guides 60A, 60B and 60C with a force substantially in the plane of travel of the second portion 17. The concave surfaces 64 redirect the vector of the force to be substantially normal to the direction of travel of the second portion 17 and into a vector substantially normal to the initial vector and in the plane of travel of the first portion 15 of the left sliding thermal barrier 12.

As the central thermal insulator 30 moves in direction of arrows 36, and particularly in the direction of arrow A1, the first portion 15 has a tendency to buckle or bind proximate the plurality of corner guides 60A, 60B and 60C. To prevent buckling or binding of the first portion 15 as the left sliding thermal barrier 12 is moved in direction of arrows A1, a roller bearing 70 is secured to the system 10 where the roller bearing has a cylindrical outer surface 72 and an axis of rotation 74 that is substantially normal to the movement as indicated by arrow A1. As the first portion 15 is moved, the bottom edge 22 is supported by the roller bearing 70 and aids in the transition about the corner guides 60A, 60B and 60C. However, the roller bearing 70 is optional.

The right sliding thermal barrier 14 is substantially the mirror image of the left sliding thermal barrier 12. The right sliding thermal barrier 14 includes a left edge 116 that is secured to a right edge 33 of a central thermal insulator 30 that moves in a direction of arrows 36. The right thermal barrier 14 includes a right edge 118 that moves in a direction of arrow B2 when left edge 116 moves a direction substantially parallel to a build plane as indicated by arrow B1. A length of the arrows B1 and B2 is substantially a length of travel from a mid-point of a build plane to a limit of the build plane.

A top edge 120 of the right sliding thermal barrier 14 is supported by a right isolator bearing housing 140 by positioning a rivet 142 through a tab 144 extending from the right isolator bearing housing 140 and a strap (not shown) and a backing layer 150 proximate the right edge 118 of the right sliding thermal barrier 112. While a rivet 142 is illustrated and disclosed herein, the present application can utilize any suitable securing mechanism such as, but not limited to a bolt and nut, a screw, a clamp, a camming mechanism and/or an adhesive.

The right isolator bearing housing 140 retains a bearing that is positioned about a top, right shaft 146 having a substantially similar cross-sectional configuration as a through bore in the bearing. The bearing provides for smooth travel of the housing 140 over the top, right shaft 146 as the central thermal insulator 30 is moved in the direction of the arrows 36.

With the top, right edge 120 located a selected distance from the top right shaft 146, a bottom edge 122 of the right sliding thermal barrier 14 is free to move relative to the top edge 120. To retain the bottom edge 122 in a selected location, a right retaining member 150 is secured to the system 10 to engage a back surface 124 of the right sliding thermal barrier 14 to retain the bottom edge 122 and the top edge 120 of the right sliding thermal barrier 14 in a substantially vertical plane as the right sliding thermal barrier 14 is moved by the central thermal insulator 30.

The right sliding thermal barrier 14 includes a corner portion 113 that transitions a first portion 115 proximate the left edge 116 to a second portion 117 proximate the right edge 132. The first portion 115 is substantially orthogonal to the second portion 117 wherein the corner portion 113 provides a location of the transition in direction. The first portion 115 can become larger or smaller depending upon the location of the central thermal insulator 30.

The second portion 117 will decrease a same length as the increase in length in the first portion 15 and the second portion 117 will increase a same length as the decrease in length of the first portion 115 as the central thermal insulator 30 moves. Therefore, the location of the corner portion 113 on the thermal barrier 14 will change relative to the left edge 132 and the right edge 116 depending upon the location of the central thermal insulator 30.

To aid in a transition of the right thermal barrier 14 from the first portion 115 to the second portion 117 and vice versa, the system 10 includes a plurality of curved guides 160A, 160B and 160C that are secured to a substantially vertical brace 162. Inner surfaces 164 of the plurality of curved guides 160A, 160B and 160C have a concave surface that is configured to engage the back surface 124 of the right sliding thermal barrier 14. As illustrated, the plurality of guides includes an upper curved guide 160A, a middle, curved guide 160B and a bottom curved guide 160C that engage the right sliding thermal barrier 14, where each curved guide 160A, 160B and 160C has substantially the same configuration.

As the central thermal insulator 30 is moved toward the curved guides 160A, 160B and 160C, the length of the first portion 115 decreases and imparts a force into the concave surface 164 in a vector along the plane of travel of the first portion 115. The concave surfaces 164 of the curved guides 160A, 160B and 160C redirects the force in a vector substantially normal to the vector in the plane of travel such that the second portion 117 moves in the direction of the redirected vector.

As the central thermal insulator 30 is moved toward the right side of the system 10, the first portion 115 grows in length and the second portion 117 decreases in length and engages the concave surfaces 164 of the curved guides 160A, 160B and 160C with a force substantially in the plane of travel of the second portion 117. The concave surfaces 164 redirect the vector of the force to be substantially normal to the direction of travel of the second portion 117 and into a vector substantially normal to the initial vector and in the plane of travel of the first portion 115 of the right sliding thermal barrier 14.

As the central thermal insulator 30 moves in direction of arrows 36, and particularly in the direction of arrow B1, the first portion 115 has a tendency to buckle or bind proximate the plurality of corner guides 160A, 160B and 160C. To prevent buckling or binding of the first portion 115 as the right sliding thermal barrier 12 is moved in direction of arrows B1, a roller bearing 170 is secured to the system 10 where the roller bearing 170 has a cylindrical outer surface 172 and an axis of rotation 174 that is substantially normal to the movement as indicated by arrow B1. As the first portion 115 is moved, the bottom edge 122 is supported by the roller bearing 170 and aids in the transition about the corner guides 160A, 160B and 160C. However, the roller bearing 170 is optional.

In operation, as the central thermal insulator 30 is moved in the direction of arrow A1, the length of the first portion 15 of the left sliding thermal barrier 12 decreases and the length of the second portion 17 of the left sliding thermal barrier 12 increases. Simultaneously with the movement of the central thermal insulator 30 in the direction of the arrow A1, the length of the first portion 115 of the right sliding thermal barrier 14 increases and the length of the second portion 117 of the right sliding thermal barrier 14 decreases.

As the central thermal insulator 30 is moved in the direction of arrow B1, the length of the first portion 115 of the right sliding thermal barrier 14 decreases and the length of the second portion 117 of the right sliding thermal barrier 14 increases. Simultaneously with the movement of the central thermal insulator 30 in the direction of the arrow B1, the length of the first portion 15 of the left sliding thermal barrier 12 increases and the length of the second portion 17 of the left sliding thermal barrier 12 decreases.

The system 10 includes an upper brace 159 secured to the top curved guides 60A, 160A and a lower brace 161 secured to the bottom curved guides 60C, 160C. The upper and lower braces 159, 161 are positioned across the span of the opening 200 proximate a top edge and a bottom edge and are configured to prevent the first portions 15 and 115 from buckling or bulging outwardly due to the resistance to travel in the plane of travel caused by the change in the direction of movement by the engagement with the curved guides 60A, 60B, 60C and 160A, 160B, 160C, all respectively.

Whether the central thermal insulator 30 is moved to the limit of travel in the direction of arrow A1 or is moved to the limit of travel in the direction of arrow B1, the left and right sliding thermal barriers 12 and 14 cover the opening 200 in the build chamber 202 as the central thermal insulator 30 moves print heads 204, 206 in the build plane. Therefore, the movement of the sliding thermal barriers 12 and 14 allows the central thermal insulator to move between the limits of travel and therefore increase the potential size of a printed 3D part relative to a pleated style thermal barrier.

Figure 3:
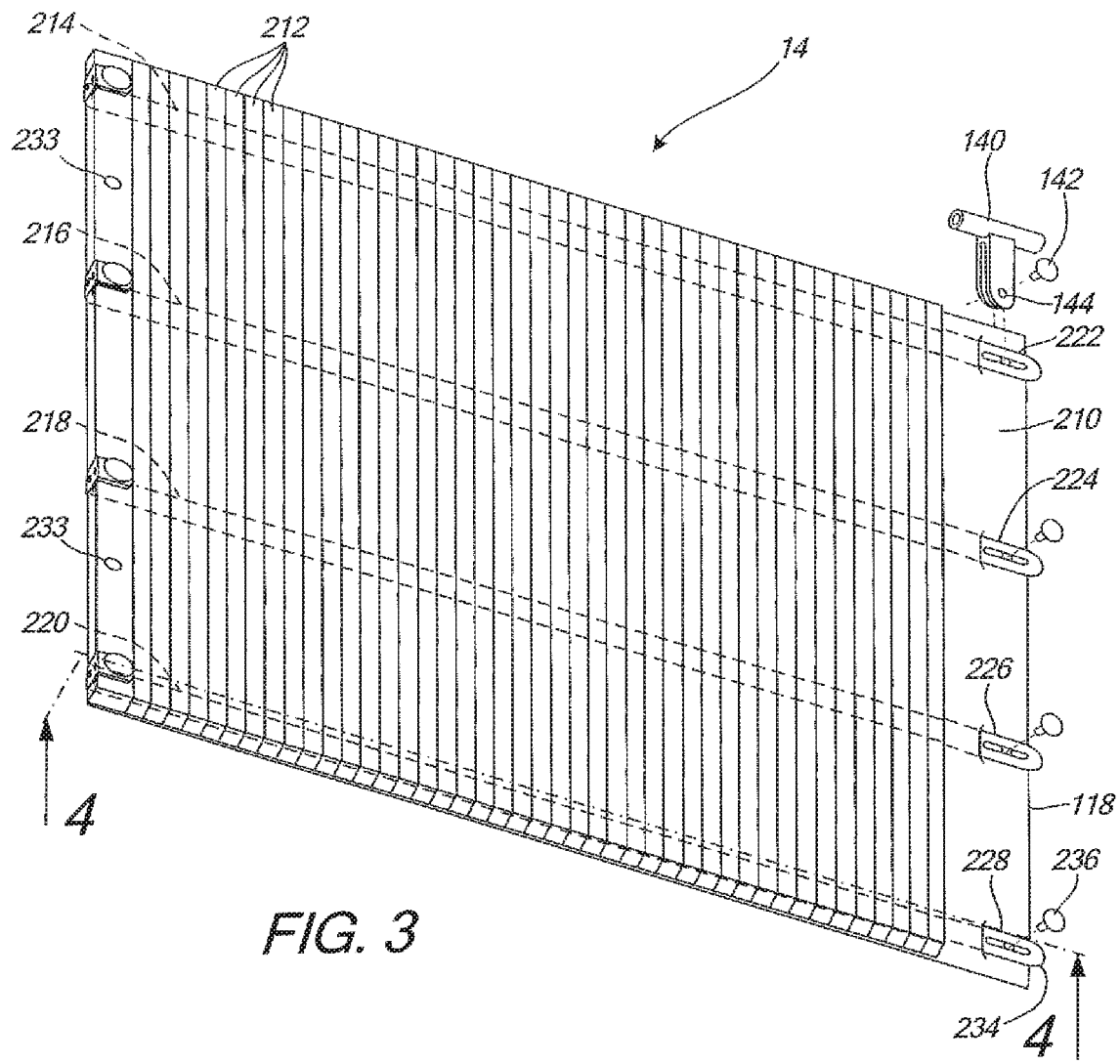
FIG. 3 is a perspective view of a sliding thermal barrier of the present disclosure.
Figure 4:
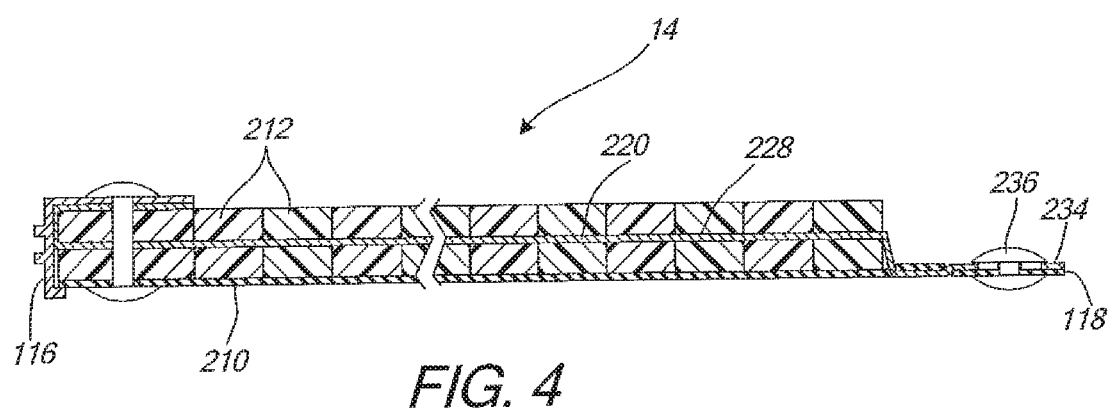
FIG. 4 is a sectional view taken along section line 4-4 in FIG. 3.

Referring to FIGS. 3 and 4, the right thermal barrier 14 is illustrated. However, the left thermal barrier 12 is similarly constructing but as a mirror image of the right thermal barrier 12.

The right thermal barrier 14 includes a backing sheet 210 that is constructed of a flexible material capable of withstanding elevated temperatures in the build chamber 202. A typical material of construction of the backing sheet 210 proximate the chamber is polytetrafluoroethylene (PTFE), as PTFE provides sufficient flexibility to travel in the directions of travel while having a sufficiently high melting temperature to prevent thermal degradation in use. While a PFTE sheet is disclosed, the present application is not limited to PTFE for the backing sheet, as any material that provides the combination of flexibility and resistance to thermal degradation at operating temperatures of the system 10 is within the scope of the present disclosure.

A plurality of insulating slats 212 are aligned on the backing sheet 210. Typically, the individual slats 212 are positioned on the sheet 210 but are not secured to the sheet 212 to provide increased flexibility of the barriers 12 and 14 and because adhesives have a tendency to melt at the operating temperatures of the system. However, it is within the scope of the present disclosure to individually secure the slats 212 to the backing sheet 210 with an adhesive such that the insulating slats 212 can move independently of each other to provide flexibility to the barrier, provided the adhesive can withstand the operating temperatures of the system 10.

Each slat 212 of the plurality of slats includes a plurality of spaced apart slots 214, 216, 218 and 220 that are aligned to provide four channels. Four straps 222, 224, 226 and 228 are positioned through the aligned slots 214, 216, 218 and 220 where a proximal end 230 of each slat is secured to a bracket 232 secured to the backing sheet 210 proximate the left edge 116 with rivets 234. A distal end 234 of the straps 222, 224, 226 and 228 are secured to the backing sheet 210 with rivets 236 proximate the right edge 118 of the barrier 14. The top strap 22 is secured to both the backing sheet 210 and the tab 144 in the right isolator bearing housing 140 with a rivet as mentioned above. While four spaced apart slots and straps are disclosed and illustrated, the present disclosure can utilized one or more straps within one or more slats to retain alignment of the slats relative to each other.

Figure 5:
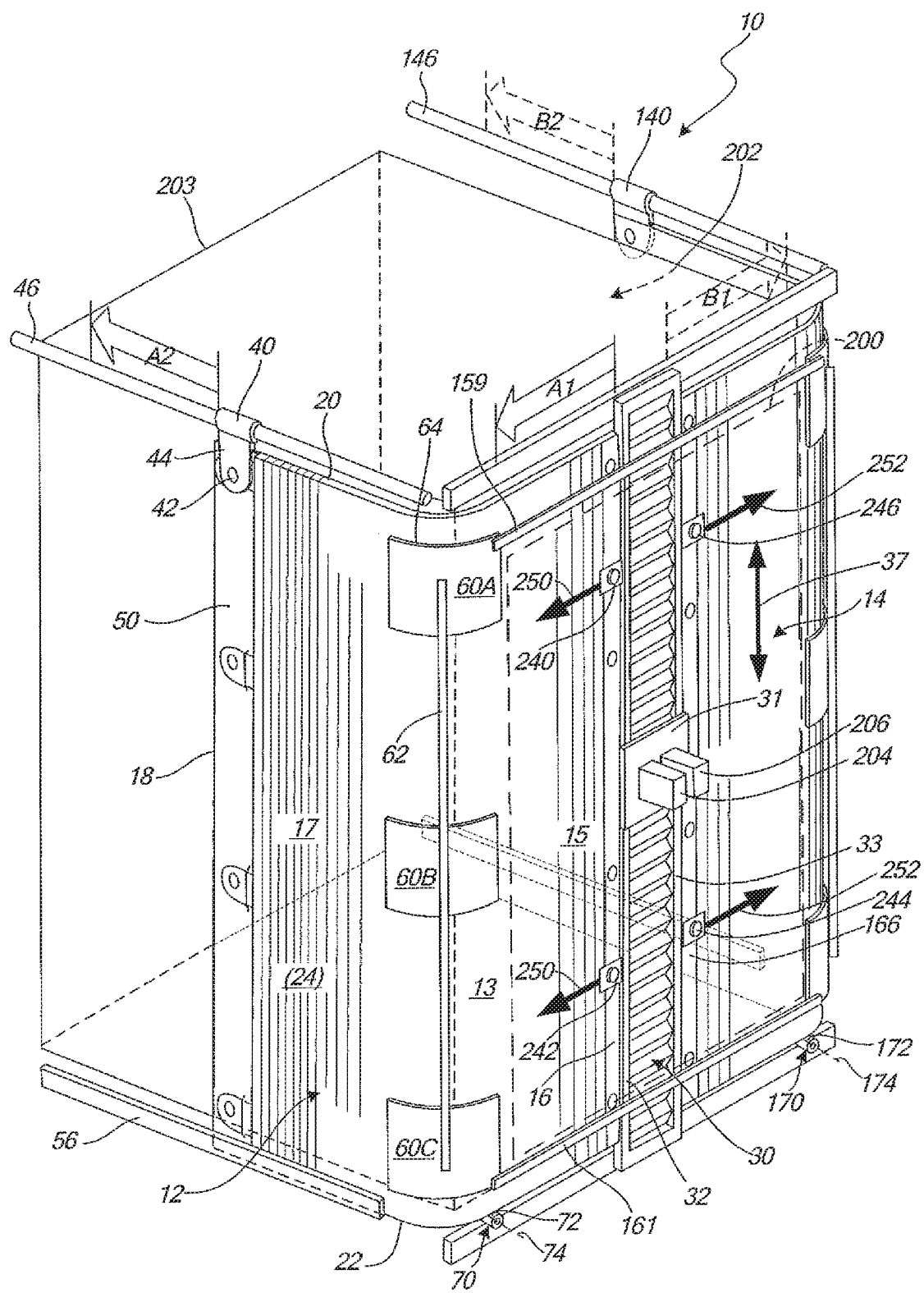
FIG. 5 is a perspective view of the exemplary additive manufacturing system of the present disclosure wherein the sliding thermal barriers can be detached from a central thermal insulator.

Referring to FIG. 5, the left and right thermal barriers 12 and 14, respectively, are removably secured to the sides 31 and 33 of the central thermal insulator 30 with latches 240, 242, 244 and 246. The latches 240, 242, 244 and 246 include a magnetic member that is positioned through apertures 233 in the bracket 232 and the bracket 231 and are magnetically attracted to the central thermal insulator 30 to retain the sliding thermal barriers 12 and 14 to the central thermal insulator 30. While a magnet latch 240, 242, 244 and 246 are illustrated, any suitable connecting mechanism can be utilized that allows the thermal barriers 12 and 14 to be retained to the central thermal insulator 30 and detached from the central thermal insulator 30 to allow access to the build chamber 202.

The thermal barriers 12 and 14 can be moved in directions of arrows 250 and 252 respectively, away from the central thermal insulator 30 to gain access to the build chamber 202. Access to the build chamber 202 can be beneficial, especially when build a 3D part that can be indexed out of a port in the build environment opposite the central thermal insulator and print heads. When the 3D part grows out of the build chamber or environment 202, there potentially is no access to the print heads or the central thermal insulator, which may cause the print operation to be stopped and the 3D part to be reprinted. As such, the present disclosure provides for access to the build chamber or environment 202 from behind the print heads, which can be advantageous to allow problems to be remedied within the build chamber 202 when the 3D part is being printed.

Alternatively, when the slats 212 are of a sufficient resistance to heat to withstand the operating temperatures of the system 10, the orientation of the left and right barriers 12 and 14 can be inverted where the backing sheet is 210 is located on the back surface 24, 124 of the left and right thermal barriers 12, 14, respectively. With the backing sheet 210 located on the back surface 24, 124, the backing sheet 210 is not exposed to the elevated temperatures when positioned proximate the build chamber, and primarily functions to prevent the flow of air or gases between the slats 212. A non-limiting example of a material of construction for the backing sheet 24 located on the back surface 24, 124 include polyethylene and polypropylene.

Figure 6:
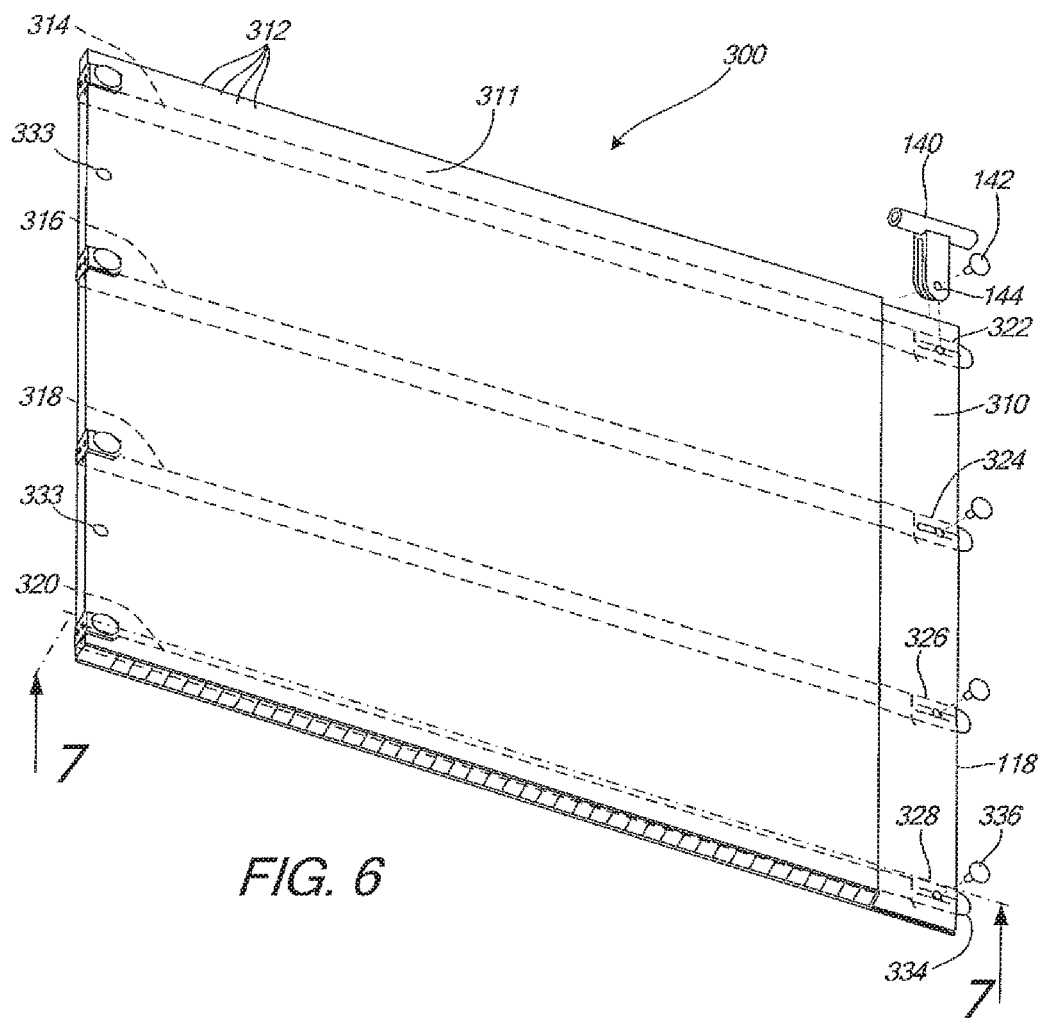
FIG. 6 is a perspective view of another embodiment of a sliding thermal barrier of the present disclosure.
Figure 7:
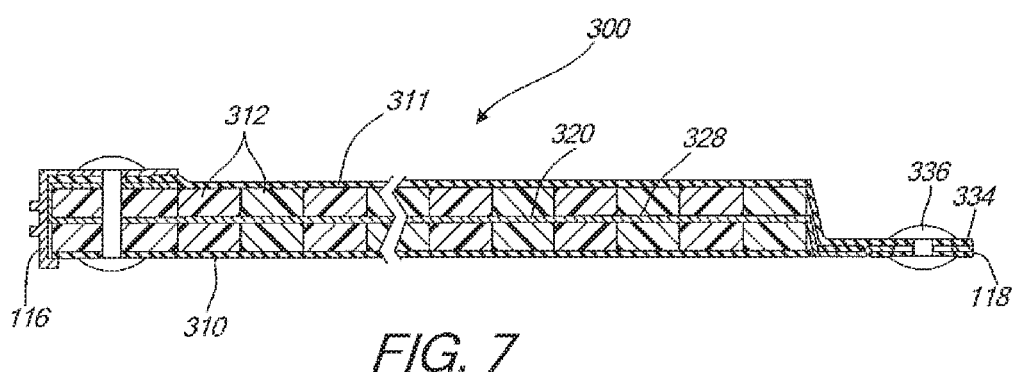
FIG. 7 is a sectional view taken along section line 7-7 in FIG. 6.

Referring to FIGS. 6 and 7, another embodiment of a thermal barrier 300 is illustrated. The reference characters in FIGS. 6 and 7 include reference numbers raised to 300 from the 200 reference characters in FIGS. 3 and 4 for similar elements.

The thermal barrier 300 includes similar slats 312, channels 314, 316, 318 and 320 and straps 322, 324, 326 and 328 as illustrated in FIGS. 3 and 4. Similarly, the attachment mechanisms 140 and 336 are the same as illustrated in FIGS. 3 and 4.

The thermal barrier 300 differs for the illustrated thermal barrier 14 in that the thermal barrier 300 includes two backer sheets 310 and 311 on opposite sides of the plurality of slats 312. When installed on the system 10, the backer sheet 310 is of a material configured to withstand the operating temperatures of the system 10. As previously discussed, a non-limiting example of the backer sheet 310 is PTFE.

The barrier 300 includes a second backer sheet 311 on the opposite side of the aligned slats 312. The second backer sheet 311 is of a material that prevents the flow of air or other gases between the slats 312 and also aids in transitioning the barrier 300 through movement about the guides 60A, 60B and 60C and the guides 160A, 160B and 160C.

While one thermal barrier 300 is illustrated, the system 10 would typically utilize two thermal barriers that are mirror images of each other, as discussed regarding the thermal barriers 12 and 14.

The presently disclosed sliding thermal barriers 12, 14 and 300 are illustrated and described as being utilized with a system 10 having a vertical printing plane. However, the sliding thermal barriers 12, 14 and 300 can be used with any additive manufacturing system that utilizes a central thermal insulator, including an additive manufacturing system that prints in a substantially horizontal print plane. In that configurations the top and bottom edges of the thermal barriers 12, 14 and 300 (as illustrated and described herein) would be retained in channels that would guide the thermal barriers 12, 14 and 300 as the central thermal insulator is moved.

The thermal barriers 12, 14 and 300 are disclosed utilizing materials that are suitable for printing 3D parts in a layer-by-layer manner with a thermoplastic based material. However, different materials of construction of the thermal barriers 12, 14 and 300 can be utilized to print 3D parts with metals and/or metal alloys, which sometimes have melting points much higher in temperature than thermoplastics traditionally used in additive manufacturing. When printing metal parts, the slats can be constructed of metals, fiberglass, ceramic, foam ceramic and/or foam glass, the backer sheets can be constructed of metals such but not limited to stainless steel or titanium, and the straps can be constructed of materials similar to that of the backer sheet(s). However, these materials are exemplary and non-limiting. The thermal barriers 12, 14 and 300 can be constructed of any material that is capable of withstanding the process conditions necessary to print parts with a selected material(s), provided the materials maintain the necessary flexibility to move with the central thermal insulator.

Although the present disclosure has been described with reference to preferred embodiments, workers skilled in the art will recognize that changes may be made in form and detail without departing from the spirit and scope of the disclosure.

The invention claimed is:

1. An additive manufacturing system comprising:
    a chamber comprising at least first and second side walls connected with a bottom wall and a top wall;
    a central deformable insulator having a first edge and a second edge;
    a print head carriage movably retained within the central deformable insulator and configured to move one or more print heads within a build plane of the build chamber; and
    a first dynamic thermal barrier and a second dynamic thermal barrier, each dynamic thermal barrier having a length between a proximal edge and a distal edge, wherein the proximal edge is configured to be secured to the first edge of the central deformable insulator and the second edge is configured to be slidably retained to the build chamber such that as the print head carriage moves laterally the first and second dynamic thermal barriers each move with the print head carriage and retain their length and are configured to flex and move in a non-planar path.

2. The additive manufacturing system of claim 1 and wherein the first and second dynamic thermal barrier each comprise:
    a first backer sheet having a first edge and a second edge and an area configured to substantially cover the opening;
    a plurality of slats positioned on the first backer sheet, wherein each slat comprises at least one slot wherein when the plurality of slats is positioned side by side, the at least one slot of the plurality of slats forms at least one channel; and
    at least one strap positioned within each of the at least one channel, the at least one strap having a proximal end and a distal end, the proximal end of the strap secured proximate the first edge of the first backer sheet and the distal end secured proximate the second edge of the first backer sheet.

3. The additive manufacturing system of claim 1 and wherein the first and second dynamic thermal barriers each comprise:
    a plurality of slats positioned side by side wherein the plurality of slats comprises a first side and a second side, wherein each slat comprises at least one slot wherein when the plurality of slats are positioned side by side, the at least one slot of the plurality of slats forms at least one channel;
    a first backer sheet having a first edge and a second edge and an area configured to substantially cover the opening, wherein the first backer sheet is positioned proximate the first side of the plurality of slats;
    a second backer sheet having a first edge and a second edge and an area configured to substantially cover the opening, wherein the second backer sheet is positioned proximate the second side of the plurality of slats; and
    at least one strap positioned within the at least one channel, the at least one strap having a proximal end and a distal end, the proximal end of the strap secured proximate the first edges of the first and second backer sheets and the distal end secured proximate the second edges of the first and second backer sheets.

4. The additive manufacturing system of claim 2 and further comprising:

a first top shaft secured to the first side wall proximate a top edge; and
a first bearing configured to travel on the first top shaft and wherein the first bearing is secured to the backer sheet proximate a top edge and the second edge wherein as the print head carriage moves in a lateral direction, the first bearing and the second edge moves a similar lateral distance as the print head carriage.

5. The additive manufacturing system of claim 3 and further comprising:
a first retaining member secured to the first side wall proximate a bottom edge wherein the first retaining member is configured to engage a back surface of the first dynamic thermal barrier proximate a bottom edge; and
a second retaining member secured to the second side wall proximate a bottom edge wherein the second retaining member is configured to engage a back surface of the second dynamic thermal barrier proximate a bottom edge.

6. The additive manufacturing system of claim 1 and wherein each of the first and second dynamic thermal barriers comprise:
a first portion proximate the proximal edge wherein the first portion is located in a first plane;
a second portion proximate the distal edge wherein the second portion is located in a second plane substantially orthogonal to the first plane; and
a transition portion connecting the first portion and the second portion wherein the transition portion comprises an arcuate configuration.

7. The additive manufacturing system of claim 6 and further comprising:
at least one first guide located proximate the transition portion of the first dynamic thermal barrier, wherein the at least one first guide comprises a concave inner surface configured to direct the first dynamic thermal barrier between the first portion and the second portion.

8. The additive manufacturing system of claim 7 and further comprising:
at least one linear guide substantially spanning the opening, the at least one linear guide positioned proximate the first dynamic thermal barrier and configured to prevent bulging or puckering of the first thermal barrier when the first thermal barrier is moved.

9. The additive manufacturing system of claim 8 and further comprising:
at least one second guide located proximate the transition portion of the second dynamic thermal barrier, wherein the at least one second guide comprises a concave inner surface configured to direct the second dynamic thermal barrier between the first portion and the second portion.

10. The additive manufacturing system of claim 1 and further comprising a first securing mechanism configured to removably retain the proximal edge of the first dynamic thermal barrier to the first edge of the central deformable insulator, thereby providing an access door to the build chamber.

11. The additive manufacturing system of claim 10 and further comprising a second securing mechanism configured to removably retain the proximal edge of the second dynamic thermal barrier to the second edge of the central deformable insulator, thereby providing an access door to the build chamber.

12. An additive manufacturing system comprising:
a build chamber comprising at least first and second side walls connected with a bottom, a top wall and a back wall;
a central deformable insulator having a first edge and a second edge;
a print head carriage movably retained within the central deformable insulator and configured to move print heads within a build plane of the build chamber; and
a first dynamic thermal barrier having a first length between a proximal edge and a distal edge, wherein the proximal edge is configured to be removably secured to the first edge of the a central deformable insulator with a first securing mechanism and a second edge is configured to be slidably retained to the build environment chamber such that as the print head carriage moves laterally the first dynamic thermal barrier moves with the print head carriage and retains the first length and is configured to flex and move in a non-planar path; and
a second dynamic thermal barrier having a second length between a proximal edge and a distal edge, wherein the proximal edge is configured to be removably secured to the second edge of the a central deformable insulator with a second securing mechanism and a second edge is configured to be slidably retained to the build chamber such that as the print head carriage moves laterally the second dynamic thermal barrier moves with the print head carriage and retains the second length and is configured to flex and move in a non-planar path.

13. The additive manufacturing system of claim 12 and wherein the first and second dynamic thermal barriers are substantially mirror images and wherein the first and second thermal barriers each comprises:
a first backer sheet having a first edge and a second edge and an area configured to substantially cover the opening;
a first plurality of slats positioned side by side on the first backer sheet and individually secured to the first backer sheet, wherein each slat comprises at least one slot wherein when the first plurality of slats is positioned side by side, the at least one slot of the plurality of slats forms at least one first channel; and
at least one first strap positioned within the at least one first channel, the at least one first strap having a proximal end and a distal end, the proximal end of the first strap secured proximate the first edge of the first backer sheet and the distal end secured proximate the second edge of the first backer sheet.

14. The additive manufacturing system of claim 12 and wherein the first and second dynamic thermal barriers are substantially mirror images and wherein the first and second thermal barriers each comprises:
a plurality of slats positioned side by side wherein the plurality of slats comprises a first side and a second side, wherein each slat comprises at least one slot wherein when the plurality of slats is positioned side by side, the at least one slot of the plurality of slats forms at least one channel;
a first backer sheet having a first edge and a second edge and an area configured to substantially cover the opening, wherein the first backer sheet is positioned proximate the first side of the plurality of slats;
a second backer sheet having a first edge and a second edge and an area configured to substantially cover the opening, wherein the second backer sheet is positioned proximate the second side of the plurality of slats; and
at least one strap positioned within the at least one channel, the at least one strap having a proximal end and a distal end, the proximal end of the strap secured proximate the first edges of the first and second backer sheets and the distal end secured proximate the second edges of the first and second backer sheets.

15. The additive manufacturing system of claim 12 and further comprising:
   a first top shaft secured to the first side wall proximate a top edge;
   a first bearing configured to travel on the first top shaft and wherein the first bearing is secured to the first backer sheet proximate a top edge and the second edge wherein as the print head carriage moves the first bearing and the second edge moves a similar distance as the print head carriage;
   a second top shaft secured to the second side wall proximate a top edge; and
   a second bearing configured to travel on the second top shaft and wherein the second bearing is secured to the second backer sheet proximate a top edge and the second edge wherein as the print head carriage moves the second bearing and the second edge moves a similar distance as the print head carriage.

16. The additive manufacturing system of claim 15 and further comprising:
   a first retaining member secured to the first side wall proximate a bottom edge wherein the first retaining member is configured to engage a back surface of the first dynamic thermal barrier proximate a bottom edge; and
   a second retaining member secured to the second side wall proximate a bottom edge wherein the second retaining member is configured to engage a back surface of the second dynamic thermal barrier proximate a bottom edge.

17. The additive manufacturing system of claim 12 and wherein the first and second dynamic thermal barriers both comprise:
   a first portion proximate the proximal edge wherein the first portion is located in a first plane;
   a second portion proximate the distal edge wherein the second portion is located in a second plane substantially orthogonal to the first plane; and
   a transition portion connecting the first portion and the second portion wherein the transition portion comprises an arcuate configuration.

18. The additive manufacturing system of claim 17 and further comprising:
   at least one first guide located proximate the transition portion of the first dynamic thermal barrier, wherein the at least one guide comprises a concave inner surface configured to direct the first dynamic thermal barrier between the first portion and the second portion
   at least one second guide located proximate the transition portion of the second thermal barrier, wherein the at least one guide comprises a concave inner surface configured to direct the second dynamic thermal barrier between the first portion and the second portion.

19. The additive manufacturing system of claim 18 and further comprising:
   at least one linear guide attached to the first and second guides, the at least one linear guide positioned proximate the first and second dynamic thermal barriers and configured to prevent bulging or puckering of the first and second thermal barrier when moved.

20. The additive manufacturing system of claim 18 and further comprising:
   a first roller bearing secured proximate a bottom edge of the back wall proximate the at least one first guide wherein the first roller bearing is configured to engage the bottom edge of the first dynamic thermal barrier to assist in moving the first dynamic thermal barrier as the print head carriage moves; and
   a second roller bearing secured proximate a bottom edge of the back wall proximate the at least one second guide wherein the second roller bearing is configured to engage the bottom edge of the second dynamic thermal barrier to assist in moving the second dynamic thermal barrier as the print head carriage moves.

* * * * *